H. L. FRANKEL.
MOVABLE SUPPORT FOR THE BACK.
APPLICATION FILED AUG. 28, 1915.
1,188,537.
Patented June 27, 1916.
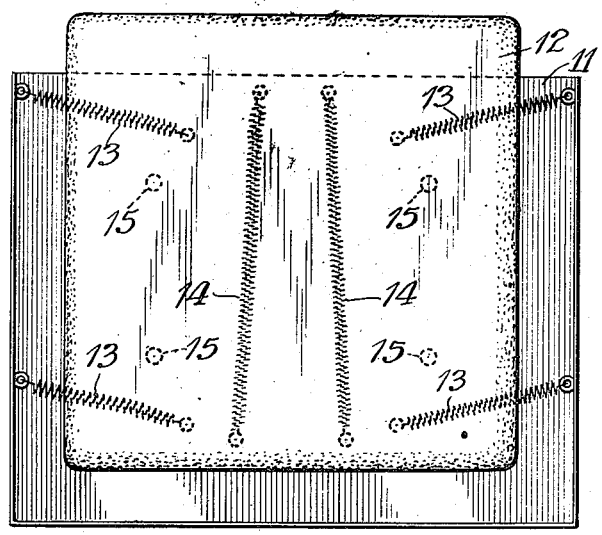
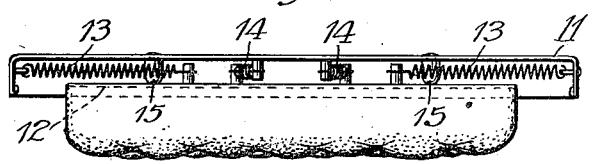
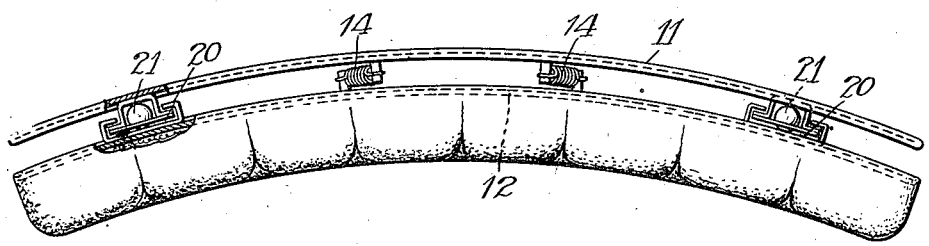
Witnesses
Martin H. Olsen.
Arthur B. Framke.
Inventor
Herman L. Frankel
By Hyman Eli Goldberg Atty.

UNITED STATES PATENT OFFICE.

HERMAN L. FRANKEL, OF CHICAGO, ILLINOIS.

MOVABLE SUPPORT FOR THE BACK.

1,188,537.  Specification of Letters Patent.  Patented June 27, 1916.

Application filed August 28, 1915. Serial No. 47,786.

*To all whom it may concern:*

Be it known that I, HERMAN L. FRANKEL, a citizen of the United States, residing at Chicago, in the county of Cook and State of Illinois, have invented certain new and useful Improvements in Movable Supports for the Back, of which the following is a specification.

My invention is a movable support for the back. It can be applied to chairs and vehicle chairs. It is especially adapted for automobiles.

It has been noticed by me in driving an automobile that whenever the car passes a bump the occupants of the car are jolted either upward or sidewise, sometimes in both directions, and that thereupon an unpleasant sensation is experienced due to the rubbing of the occupant against the back of the seat of the car. This sensation is found particularly strong and unpleasant by the driver of the car, who ordinarily braces himself against the pedals and thus pushes himself against the back upholstery of his seat with considerable force. Moreover, this resistance to motion in an upward direction, because of the pressure exerted against the back of the seat makes the springs in the seat bottom less effective on the occupant than they otherwise would be, the difference being easily felt by the driver when he leans forward. In order to eliminate this unpleasant sensation, I have provided the car with a movable back support for the driver and other passengers instead of a fixed support. Upon passing over a bump the driver is thrown into the air but the movable support is also thrown into the air and therefore there is no rubbing action between the back of the driver and the support. Upon actual trial it is found that the unpleasant sensation is either completely eliminated or at least very much diminished. While this is the main application that I have in mind for my invention, it is perfectly evident that it might be applied in other ways, for instance, to vehicle chairs for invalids and for reading chairs.

The invention is illustrated by the accompanying drawings, of which:

Figure 1 shows a front view of the mechanism thereof. Fig. 2 shows a top view thereof. Fig. 3 shows a modification of Fig. 2.

Referring to the first two figures, it will be seen that the mechanism is provided with a plate 11, which I shall call its back framing, and a plate 12, which I shall call the movable panel. The latter is ordinarily upholstered. The panel or movable back 12 is supported by means of the fixed back framing 11 through the mediation of springs 13 and 14. There are also some studs 15 riveted into the back plate 11 and rubbing against the panel plate 12 to prevent the latter from too closely approaching the plate 11, thus affording room between them and preventing the springs 13 and 14 from being pinched. Ordinarily the combination is placed in the auto in an inclined position, and it is therefore not necessary to provide means to prevent the plate 12 from being thrown away from the plate 11, as gravity and the tension of the springs 13 and 14 and the pressure of the back of the occupant are sufficient to hold it in place. The springs 14 hold the plate 12 in a central position vertically, but it is found that the springs 13 ordinarily furnish all the lifting force that is required and thus function to hold the plate 12 both vertically and horizontally in a central position.

In Fig. 3 is shown a modification of the mechanism, this modification illustrating the fact that the support may be curved instead of straight and also that it may be provided with guides 20 and balls 21, thus providing an easily moved support for the front plate 12.

In the drawings the springs have been shown as supporting the seat vertically and laterally, but no spring mechanism has been shown tending to return the seat downward when displaced too far up from its normal or central position, as would happen when the car is jolted upward. Ordinarily the pressure of the occupant's back and the weight of the movable back are sufficient to accomplish this result. Of course special springs might have been added for that purpose but were found unnecessary.

There have been built before my invention movable backs for vehicles and chairs, but as far as I know they have always been built integrally as a part of the vehicle or a part of the chairs and not as independent readily demountable structures. In my invention the movable back or panel and its framework and supporting springs constitute a mechanism complete in itself that can be taken by its owner and installed as an accessory in wagons, carriages, automobiles or in chairs; for instance, parlor car chairs and others. I consider the fact that the mechanism is complete in itself to be a great advantage, as each person may have one of his own, built particularly for his size if he so desires. Moreover, he might use the same mechanism in more than one vehicle; for instance, a driver who is compelled to drive various vehicles may have a movable support of his own and transfer it from one vehicle to another, as he desires. In order readily to find room for such an independent, self-contained support for the back I have built it rather flat, that is its depth perpendicularly to the surface of the movable panel is but small, so that it will not occupy too much room when placed against the fixed framing of the vehicle. Again, it has been so constructed that no arms or other projections can interfere, the spring mechanism being all located within the small space behind the movable panel and in front of the fixed framing of the support. It is perfectly obvious that the mechanism might be somewhat modified without departing from the spirit thereof. For instance, instead of tensile springs compression springs might be used. Again, it might be found a matter of convenience to change the fixed framing of the mechanism from a solid plate to a plate whose weight is lightened by having some holes cut therein.

I claim:

1. As an article of manufacture of the character described adapted to be manufactured and sold as an entirety, a yielding auxiliary back adapted to be demountably supported by the vehicle seat, its permanent back and the back of the occupant of the seat, comprising the combination of a back framing, a movable panel, and spring mechanism supporting said movable panel on said back framing and permitting displacement of the panel both laterally and vertically and tending to return said panel to a normal position when shifted therefrom by a relative movement of the occupant and said permanent back of the vehicle, substantially as described.

2. As an article of manufacture of the character described adapted to be manufactured and sold as an entirety, a yielding auxiliary back adapted to be demountably supported by the vehicle seat, its permanent back and the back of the occupant of the seat, comprising the combination of a back framing plate, a panel supported by said plate but adapted to have movement thereon parallel to the surface of said plate, the framing plate and the panel being parallel to each other, and a set of springs each having one of its ends attached to the framing plate and the other of its ends attached to the movable panel and tending to return said panel to a normal position when displaced therefrom by the relative movement of the occupant and the fixed back of the vehicle, the auxiliary yielding back being thus built flat and thin and occupying but little room behind the occupant's back, substantially as described.

HERMAN L. FRANKEL.

Witnesses:
G. A. BRUECKNER,
AUGUST M. BLIX.